July 21, 1970

SHIGERU SUZUKI 3,521,056

ADJUSTABLE SPECIMEN STAGE FOR ELECTRON BEAM APPARATUS
EMPLOYING ADJUSTING LEVERS ARRANGED TO MINIMIZE
BEAM DEFOCUSSING RESULTING FROM THERMAL
EXPANSION OF STAGE COMPONENTS

Filed Jan. 29, 1968

INVENTOR.
Shigeru Suzuki
BY
Webb, Burden, Robinson & Webb

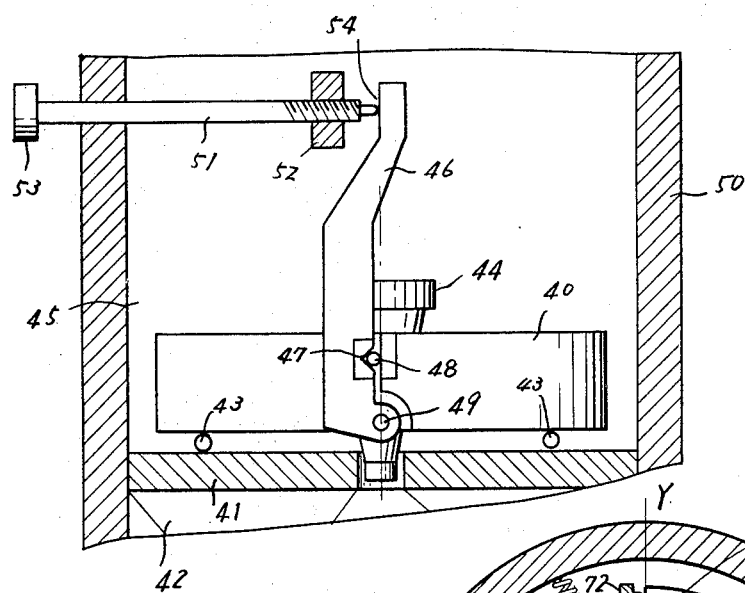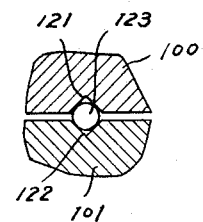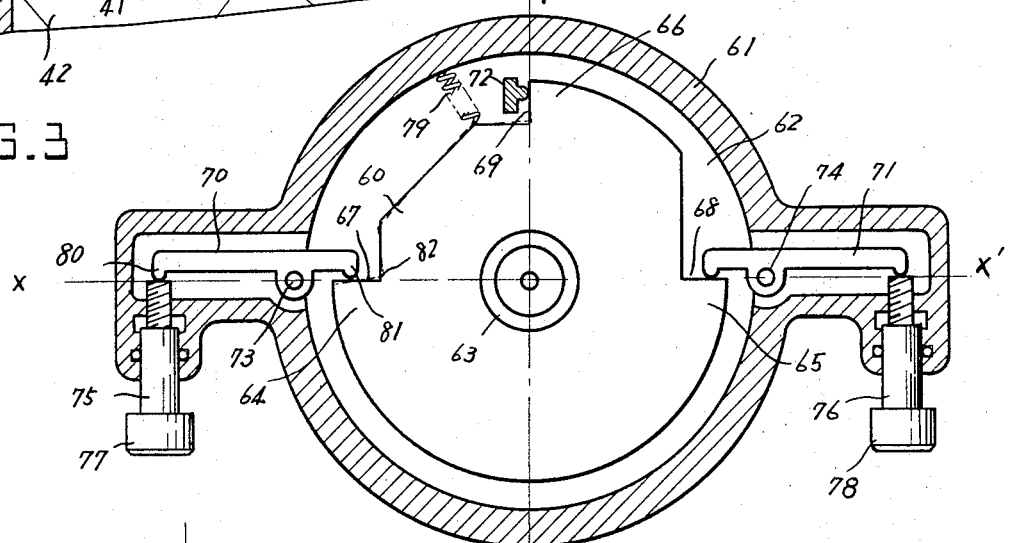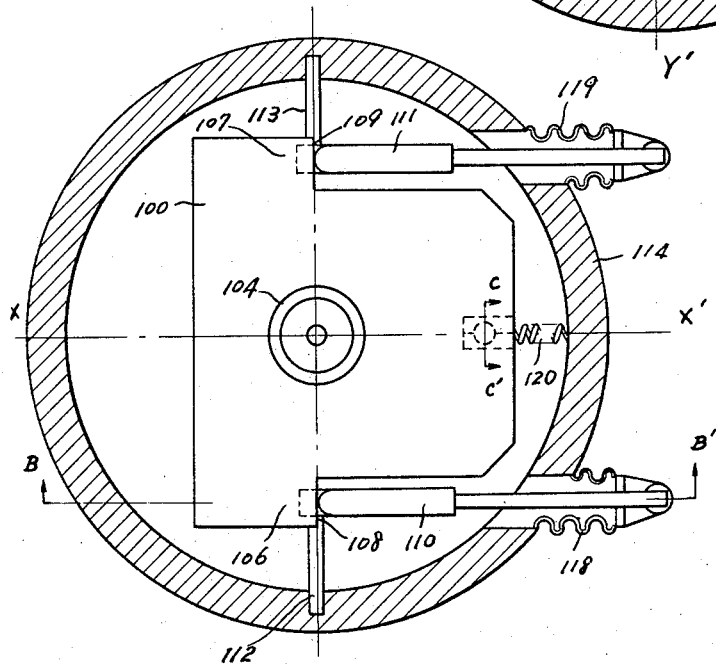

United States Patent Office 3,521,056
Patented July 21, 1970

3,521,056
ADJUSTABLE SPECIMEN STAGE FOR ELECTRON BEAM APPARATUS EMPLOYING ADJUSTING LEVERS ARRANGED TO MINIMIZE BEAM DEFOCUSSING RESULTING FROM THERMAL EXPANSION OF STAGE COMPONENTS
Shigeru Suzuki, Tokyo, Japan, assignor to Nihon Denshi Kabushiki Kaisha, Tokyo, Japan, a corporation of Japan
Filed Jan. 29, 1968, Ser. No. 701,305
Claims priority, application Japan, Feb. 3, 1967, 42/6,953; June 1, 1967, 42/35,030
Int. Cl. H01j 37/26
U.S. Cl. 250—49.5
8 Claims

ABSTRACT OF THE DISCLOSURE

An adjustable specimen device for use in electron beam apparatus which has an optical axis and which includes a specimen stage that is movable in a plane perpendicular to the optical axis, the movement being accomplished by levers and spring biasing means that are effective against heat misalignment.

---

My invention relates to electron beam apparatus, and, more particularly, to an improved adjustable specimen device suitable for use with electron microscopes and the like.

Although many developments have been made to improve the resolution of the electron microscope and other electron beam apparatus, the problem of specimen shift due to ambient temperature variations has not been satisfactorily solved. For example, when an objective lens is excited, the specimen stage and lens yokes expand because of the heat generated by the lens coil, thus causing the specimen to move slightly out of true alignment with respect to the electron beam, resulting in a lowering of the resolution. At present, electron microscopes are designed to incorporate various attachments such as specimen heating and cooling attachments, which, while enabling a greater range of information to be obtained, add to the problem of specimen shift resolution due to expansion and contraction resulting from heat variations.

The aforementioned conditions are attributable primarily to the fact that in a conventional specimen stage, as described for example in United States Letters Pat. No. 2,423,158, adjusting rods support the specimen stage in an axial direction. While this arrangement of support is ideal for specimen stage manipulation, it does not take into consideration specimen stage displacement caused by heat variation. That is, when the adjusting rods expand or contract in accordance with heat variations, the rods tend to act with a slight pushing or pulling movement on the stage.

However, with my invention, stage displacement is almost entirely eliminated and precise, fractional specimen stage adjustment is ensured. Furthermore, since in my invention levers are provided to move the specimen stage whereby the lever oscillates with the circular movement of the stage, and its fulcrum is maintained substantially on a line that is perpendicular to the electron beam axis; displacement is very slight, regardless of expansion or contraction, because the distance between the lever fulcrum and the specimen stage is very small.

Accordingly, my invention minimizes the stage displacement caused by heat variation by utilizing levers to manipulate the specimen stage in electron microscopes, etc. It is possible with my invention to provide extremely precise and fractional specimen stage adjustment.

Briefly stated, my invention provides an adjustable specimen device having a specimen stage movably mounted on the yoke of an objective lens and having an opening through which an electron beam may pass. A specimen holder is mounted in the opening and a pair of levers are provided for moving the specimen stage in a direction at right angles to the optical axis but which do not move the stage in the axial direction. The specimen stage is spring biased so that it is in contact with the levers at all times.

In the accompanying drawings I have illustrated the present preferred embodiments of my invention wherein, FIG. 1 is a perspective view partially in section of an electron microscope utilizing my adjustable specimen device;

FIG. 3 is an elevation of a second embodiment of my invention in which the housing is shown in section;

FIG. 4 is a view similar to FIG. 2 showing another embodiment of my invention;

FIG. 5 is a view similar to FIG. 2 showing a further embodiment of my invention;

FIG. 7 is a cross section taken along line C–C' of FIG. 5; and,

Figure 1:
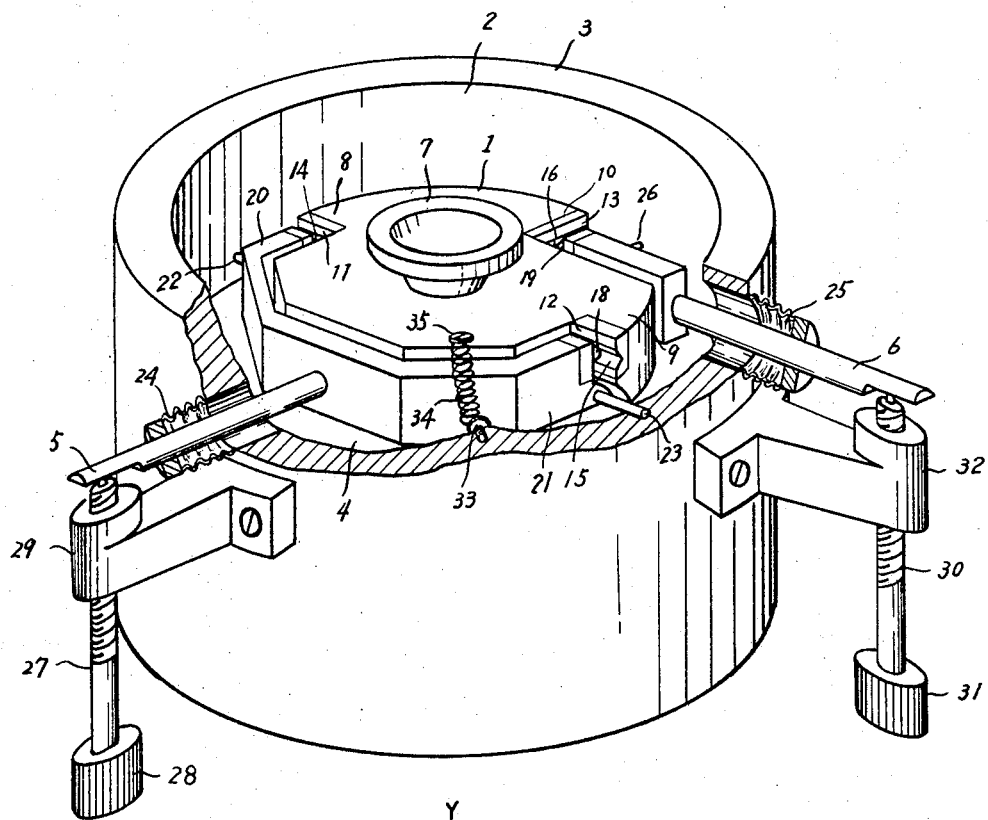
Figure 2:
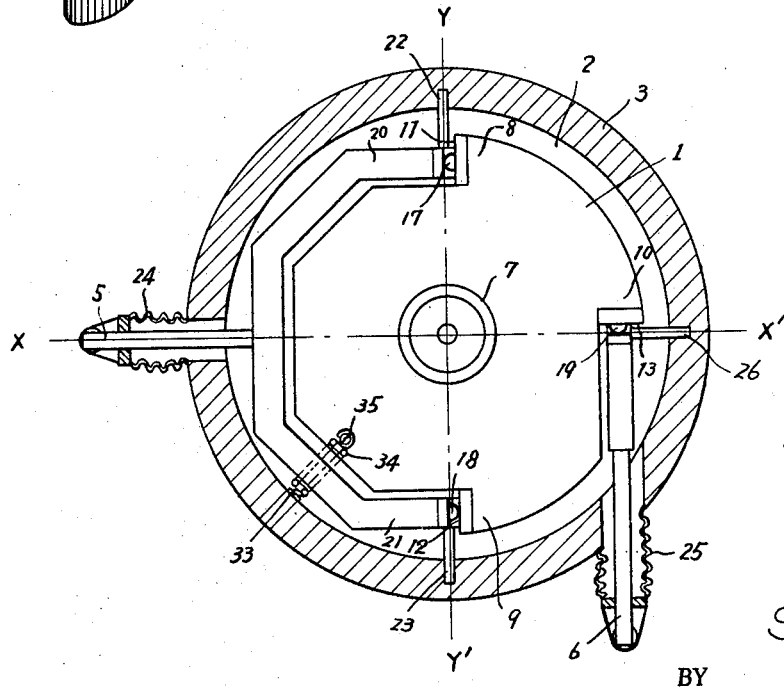
FIG. 2 is a plan view of the specimen device shown in FIG. 1 in which the housing is shown in section.

Referring now to FIGS. 1 and 2, there is shown an adjustable specimen stage 1 arranged within a specimen chamber 2 enclosed by a housing 3 forming part of a microscope column. The adjustable specimen stage 1 is mounted on the objective lens upper yoke 4 between which are arraanged balls (not shown), thus permitting the stage to be moved by levers 5 and 6.

A specimen holder 7, at the lower part of which the specimen to be observed is positioned, is detachably mounted in an opening provided at the center of specimen stage 1. An electron beam emitted from an electron gun (not shown) passes through the center of the specimen holder to irradiate the specimen, the image of which is projected onto a fluorescent screen (not shown). The specimen stage 1 is provided with flanges 8, 9 and 10, the surfaces or faces 11 and 12 of flanges 8 and 9 being cut at substantially the same plane and approximately in line with the Y–Y' axis passing through the center of the specimen stage 1. Surface 13 of flange 10 is cut so as to be perpendicular to the surfaces or faces 11 and 12 and approximately in line with the X–X' axis also passing through the center of the specimen stage 1. These three flange surfaces are indented with V-shaped grooves 14, 15 and 16 in which steel balls 17, 18 and 19 are positioned.

One end of lever 5 extends to the exterior of the microscope column, the other end forming a two-pronged fork 20 and 21 whose surfaces are brought into contact with surfaces or faces 11 and 12 of flanges 8 and 9 by means of balls 17 and 18. Lever 6, one end of which extends to the exterior of the microscope, is similarly brought into contact with face 13 of flange 10 by means of ball 19.

Bellows 24 and 25 are provided in the housing wall to form an airtight seal between the wall and levers 5 and 6, thus preventing any deterioration in the column vacuum. Lever 5 is supported by pins 22 and 23 which are orientated in line with the Y–Y' axis and which are fixed to the housing wall and serve as fulcra for lever 5. Lever 6 is similarly supported by pin 26 in which the line of orientation coincides with the X.X' axis.

A threaded bolt 27 provided with knob 28 is supported at right angles to lever 5 by holder 29 which is secured to the housing wall 3. One end of the bolt is brought into contact with a flat underside of the lever by turning knob 28 to elevate the lever and thereby controllably moving the specimen stage in the X' direction. Lever 6 is similarly controlled by turning knob 31 attached to threaded bolt 30 which is supported by holder 32 secured to the wall of the housing. In this case, when lever 6 is elevated, surface 13 of the flange 10 moves the specimen stage 1 in the Y direction. In order to precisely adjust the specimen stage, bolts 27 and 30 are provided with a micrometer thread. A spring 34, one end of which is secured to the wall of housing 3 by means of screw 33, and the other end is secured to specimen stage 1 by means of screw 35, provides a bias so that each surface of levers 5 and 6 contact the V-shaped surfaces of the flanges 8, 9 and 10 via balls 17, 18 and 19, respectively.

With this arrangement, specimen shift due to change in the ambient temperature can be almost entirely eliminated due to the fact that pins 22, 23 and 26 are orientated along the X–X' and Y–Y' axes which pass through the center of the specimen stage as shown in FIG. 2. More specifically, even though lever 5 is raised due to the heat expansion of the threaded bolt 27, displacement of the specimen stage is extremely minimal, since the distance between ball 18 and pin 23 is extremely small compared with the length of lever 5. Moreover, when the objective lens is excited whereby the coils generate heat or when a specimen heating device is installed in the specimen chamber, the specimen stage remains stationary, since the lens yokes and specimen stage expand radially with respect to the stage center. In other words, the specimen stage is not subject to linear expansion.

The adjustable specimen stage can be fractionally moved by raising lever 5 with the threaded bolt 27 because the distance between ball 18 and pin 23 is very short as compared with the length of lever 5.

FIG. 3 shows a modified form of my invention in which adjustable specimen stage 40 is positioned within housing 45 of a microscope or the like and mounted on yoke 41 of an objective lens 42 via balls 43 or similar mounting means. Specimen holder 44, at one end of which the specimen to be observed is located, is detachably inserted in the center opening of the specimen stage. Lever 46, indented with a V-shaped groove 47 into which ball 48, for making contact with the flange surface or face is placed, is rotationally supported by means of pin 49 which is secured to the inner wall of housing 50. One end of lever 46, which is substantially perpendicular to the horizontal plane, makes contact with a threaded bolt 51 which is supported by member 52 which in turn is secured to the inner wall of housing 50. The external end of bolt 51 is provided with knob 53. The contact surface 54 and pin 49 are on the same plane, including the beam path. By rotating knob 53, lever 46 is inclined and ball 48 pushes the flange face to move the specimen stage 40.

In FIG. 4, I have shown an adjustable specimen stage 60, at the center of which a specimen holder 63 is detachably mounted, which is positioned with housing 62 of an electron microscope or the like. Specimen stage 60 has three flanges 64, 65 and 66. Surfaces 67 and 68 of flanges 64 and 65 are orientated along the X–X' axis which passes through the electron beam axis and makes contact with levers 70 and 71, respectively. The surface 69 of flange 66 lies along the Y–Y' axis which is perpendicular to the X–X' axis and which also passes through the electron beam axis. Face 69 makes contact with member 72 which is fixed to the yoke of the objective lens.

Levers 70 and 71 are rotationally and oppositely secured to housing 61, forming part of the microscope column, by means of pins 73 and 74 which function as fulcra. The ends of each lever make contact with threaded bolts 75 and 76 which are provided with O-rings to ensure an airtight seal. The exterior ends of threaded bolts 75 and 76 are equipped with adjustment knobs 77 and 78, respectively. A spring 79 is attached between the specimen stage and the wall of housing 61 so that surfaces or faces 67, 68 and 69 of flanges 64, 65 and 66 make contact with levers 70 and 71 and the member 72, respectively at all times.

In this arrangement, the displacement of the specimen stage is effected by means of the adjustable threaded bolts 75 and 76. For example, when knob 77 is turned, the lever end 80 is raised up forcing down the lever end 81 onto flange 64, thereby moving specimen stage 60. As a consequence, the resultant displacement is shown by dotted line 82. Moreover, in this arrangement, displacement of the specimen stage due to temperature variations in either the stage itself or its ambient temperature does not occur, since levers 70 and 71 and member 72 do not come into contact with the specimen stage in the direction of heat expansion. Therefore, a clear, sharp specimen image will be ensured.

Figure 6:
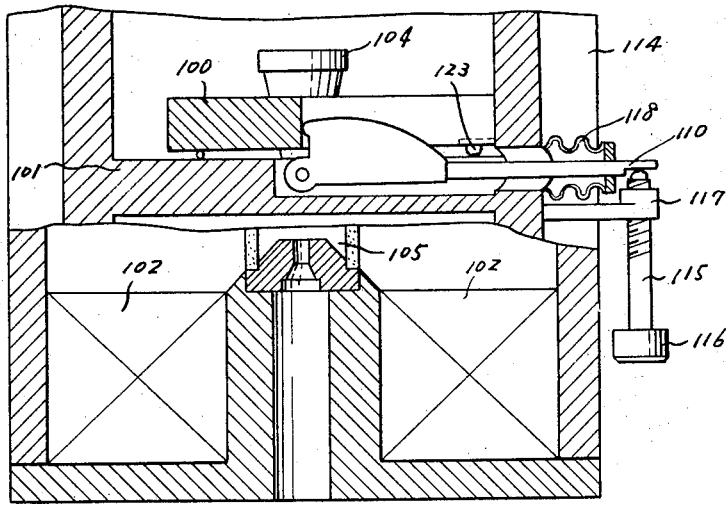
FIG. 6 is a cross section of the embodiment shown in FIG. 5 taken along line B–B'.

In the embodiment of my invention shown in FIGS. 5, 6 and 7, an adjustable specimen stage 100 is mounted on yoke 101 of objective lens 102 via steel balls 103 or other similar mounting means. A specimen holder 104, the lower end of which is extended into pole piece 105 of the objective lens, is detachably mounted in the center hole of the specimen stage, and the specimen to be observed is secured to the lower end of the holder. The specimen stage is provided with flanges 106 and 107 in which surfaces 108 and 109 are in contact with the ends of levers 110 and 111, respectively. These layers are rotationally supported by means of pins 112 and 113 which are secured to the wall of housing 114. The surfaces 108 and 109 and the axes of pins 112 and 113 are all substantially in the same plane perpendicular to the electron beam axis. The exterior ends of levers 110 and 111 are in contact with two threaded bolts of which only threaded bolt 115 is shown. The threaded bolts are provided with knobs of which only knob 116 is shown, the bolts being supported by holders of which only holder 117 is shown. The holders are secured to the housing.

Bellows 118 and 119 which surround levers 110 and 111, respectively, provide an airtight seal between the column wall and the levers. Spring 120 serves to move the specimen stage in a direction perpendicular to the extension line of the pins 112 and 113 which face the flange surfaces 108 and 109.

The specimen stage 100 and the yoke 101 are each indented with diametrically opposed V-shaped grooves 121 and 122, respectively, (see FIG. 7) between which a ball 123 is disposed as the center of movement of the specimen stage. The grooves are arranged in parallel with the X–X' axis. In this embodiment, the displacement of the specimen stage due to temperature change can be almost entirely eliminated since the lever makes contact with the specimen stage perpendicularly to the flange surface, thus the lever is not affected by thermal expansion of the speciment stage.

Figure 8:
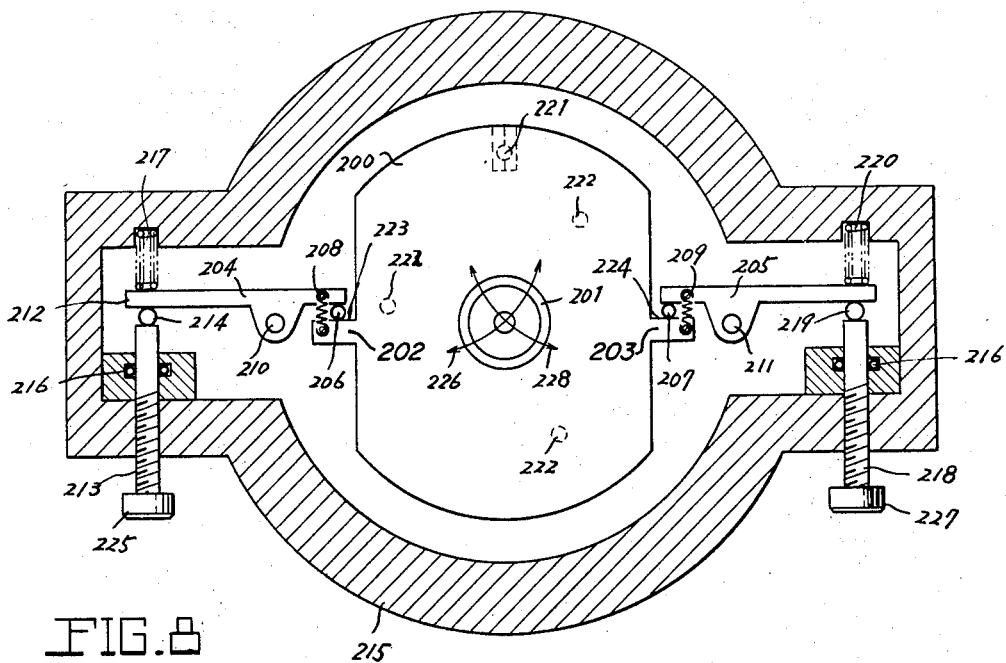
FIG. 8 is a view similar to FIG. 2 showing another embodiment of my invention.

In FIG. 8, specimen stage 200 is movably mounted on three balls 222 and is provided with an inverted cone-shaped opening into which a specimen holder 201 is inserted. The specimen stage is also provided with two flanges 202 and 203 which are brought into contact with the levers 204 and 205 by means of balls 206 and 207. The balls are tensionally maintained in place by means of springs 208 and 209. The two levers are rotationally mounted on the upper yoke of the objective lens by means of pins 210 and 211 which function as fulcra. The flange surfaces in contact with the balls and the lever pins are maintained on the same transverse plane as the electron beam axes. The extension line of the said plane and the pin being at right angles to the electron beam axes.

One end of the lever 212 makes contact with a threaded bolt 213 via a ball 214. The threaded bolt extends to the outside of the microscope housing 215 and is provided with an O-ring 216 to ensure an airtight seal. The lever is kept tensionally pressed against the bearing by means of a spring 217. The lever 205 is also similarly arranged. One end of the lever makes contact with a threaded bolt 218 via ball 219 and at the same time the lever is tensionally pressed against the ball by means of spring 220.

A ball bearing 221 is arranged between the specimen stage and the yoke as shown in FIG. 7. That is to say, the ball is arranged in a space provided by V-shaped grooves provided by the specimen stage and yoke grooves. The direction of these grooves is perpendicular to the extension line of the flange surfaces 223 and 224.

In this arrangement, when the knob 225 is turned, the specimen stage 200 executes accurate motion in the directions shown by curved line arrow 226. When the knob 227 is turned, the specimen stage executes accurate motion in directions shown by curved line arrow 228. In both cases, the center of rotation is the ball 221.

As explained in the above embodiments, the present invention provides an improved specimen device suitable for use with a variety of attachments without displacing the specimen stage due to temperature change and thereby retaining high resolution.

While I have shown and described preferred embodiments of my inveniton, it may otherwise be embodied within the scope of the appended claims.

I claim:
1. An adjustable specimen device for use in electron beam apparatus having an optical axis comprising:
 (A) a movably mounted specimen stage having an opening therethrough at the optical axis;
 (B) a specimen holder mounted in said opening;
 (C) said specimen stage having a plurality of lever contacting surfaces, said surfaces being approximately in line with lines passing through the center of the specimen stage and said lines being perpendicular to the optical axis;
 (D) a plurality of levers for moving the specimen stage in a plane perpendicular to the optical axis, said levers contacting said specimen stage on said lever contacting surfaces; and
 (E) a spring means for biasing the specimen stage against the levers.

2. An adjustable specimen device as set forth in claim 1 characterized by one of said levers having a bifurcated end to which fulcra are arranged on a first line passing through the optical axis, another said lever having a fulcrum on a second line passing through the optical axis perpendicularly to said first line.

3. An adjustable specimen device as set forth in claim 2 wherein said specimen stage includes a pair of lever contacting surfaces having V-shaped grooves substantially parallel to said first line and a third lever contacting surface having a V-shaped groove substantially parallel to said second line, each of said grooves being provided with a ball; and said levers contacting said balls for movement of said stage.

4. An adjustable specimen device as set forth in claim 1 wherein said specimen stage includes at least two lever contacting surfaces, at least one of said surfaces lying on a first line passing through the optical axis and at least one other surface lying on a second line passing through the optical axis perpendicularly to said first line.

5. An adjustable speciment device as set forth in claim 1 wherein said specimen stage includes two lever contacting surfaces lying on a first line passing through the optical axis, said levers arranged parallel to each other and having fulcra lying on said first line, said spring means for biasing said stage lying on a second line passing perpendicularly to said first line through the optical axis.

6. An adjustable specimen device as set forth in claim 1 wherein said specimen stage includes two flanges positioned symmetrically about the optical axis with lever contacting surfaces on a line perpendicular to said axis, each of said levers contacting one of said surfaces; a pair of balls positioned one each between said surface and lever, a spring means for holding said balls between said surface and lever; means for moving said levers including a ball between each of said means and said lever and springs to hold each of said balls therebetween; a pivot means on said stage whereby movement of said levers causes accurate movement of said specimen holder about said pivot.

7. An adjustable specimen device as set forth in claim 1 wherein electron beam apparatus includes an objective lens having a yoke, said specimen stage being movably mounted on said yoke.

8. An adjustable specimen device as set forth in claim 7 wherein said stage is mounted on balls adapted for movement.

References Cited

UNITED STATES PATENTS

| | | | |
|---|---|---|---|
| 2,858,444 | 10/1958 | Leisegang | 250—49.5 |
| 3,191,028 | 6/1965 | Crewe | 250—49.5 |

ARCHIE R. BORCHELT, Primary Examiner

C. E. CHURCH, Assistant Examiner